(12) United States Patent
Das et al.

(10) Patent No.: US 11,814,084 B2
(45) Date of Patent: Nov. 14, 2023

(54) TRACK CONFIDENCE MODEL

(71) Applicant: Zoox, Inc., Foster City, CA (US)

(72) Inventors: Subhasis Das, Menlo Park, CA (US);
Jifei Qian, Campbell, CA (US);
Liujiang Yan, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 175 days.

(21) Appl. No.: 17/553,938

(22) Filed: Dec. 17, 2021

(65) Prior Publication Data
US 2023/0192145 A1   Jun. 22, 2023

(51) Int. Cl.
*B60W 60/00* (2020.01)
*G06V 10/40* (2022.01)
*G06T 7/246* (2017.01)
*G06V 20/58* (2022.01)
*G01S 17/931* (2020.01)
(Continued)

(52) U.S. Cl.
CPC ....... *B60W 60/0027* (2020.02); *G01S 13/865* (2013.01); *G01S 13/867* (2013.01); *G01S 13/931* (2013.01); *G01S 17/931* (2020.01); *G06T 7/246* (2017.01); *G06V 10/40* (2022.01); *G06V 20/58* (2022.01); *B60W 2420/42* (2013.01); *B60W 2420/52* (2013.01);
(Continued)

(58) Field of Classification Search
CPC ......... B60W 60/0027; B60W 2420/42; B60W 2420/52; G01S 13/865; G01S 13/867; G01S 13/931; G01S 17/931; G01S 7/417; G06T 7/246; G06T 2207/10028; G06T 2207/20081; G06T 2207/30252; G06V 10/40; G06V 20/58; G06V 10/811; G06V 10/82
See application file for complete search history.

(56) References Cited

U.S. PATENT DOCUMENTS 9,606,539 B1 *   3/2017  Kentley ............... G01S 17/875
2019/0391578 A1 * 12/2019 Tariq ..................... G06N 3/08
2021/0343022 A1   11/2021 Cohen et al.

FOREIGN PATENT DOCUMENTS

JP    2018097765 A    6/2018
KR   20200094075 A    8/2020
(Continued)

OTHER PUBLICATIONS

The PCT Search Report and Written Opinion dated Apr. 25, 2023 for PCT application No. PCT/US2022/053027, 10 pages.

*Primary Examiner* — Ig T An
(74) *Attorney, Agent, or Firm* — Lee & Hayes, P.C.

(57) ABSTRACT

Techniques for determining an output from a plurality of sensor modalities are discussed herein. Features from a radar sensor, a lidar sensor, and an image sensor may be input into respective models to determine respective intermediate outputs associated with a tracks associated with an object and associated confidence levels. The Intermediate outputs from a radar model, a lidar model, and an vision model may be input into a fused model to determine a fused confidence level and fused output associated with the track. The fused confidence level and the individual confidence levels are compared to a threshold to generate the track to transmit to a planning system or prediction system of an autonomous vehicle. Additionally, a vehicle controller can control the autonomous vehicle based on the track and/or on the confidence level(s).

20 Claims, 5 Drawing Sheets

(51) Int. Cl.
*G01S 13/931* (2020.01)
*G01S 13/86* (2006.01)
(52) U.S. Cl.
CPC ............... *G06T 2207/10028* (2013.01); *G06T 2207/20081* (2013.01); *G06T 2207/30252* (2013.01)

(56) References Cited

FOREIGN PATENT DOCUMENTS

| | | | |
|---|---|---|---|
| WO | WO03083500 A2 | 10/2003 | |
| WO | WO-2019195363 A1 * | 10/2019 | ........... G01S 13/865 |
| WO | WO2019220319 A1 | 11/2019 | |

* cited by examiner

TRACK CONFIDENCE MODEL

BACKGROUND

Planning systems for autonomous vehicles can utilize information associated with objects in an environment to determine actions relative to those objects. For example, some existing planning systems for autonomous vehicles consider movement of objects, such as other vehicles on the road, when determining maneuvers for the autonomous vehicle to traverse through the environment. Conventional systems may combine data from different modalities such as radar, lidar, and/or vision to determine information about the object(s). However, when one or many modalities do not detect an object, a resulting track may have a low confidence level.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
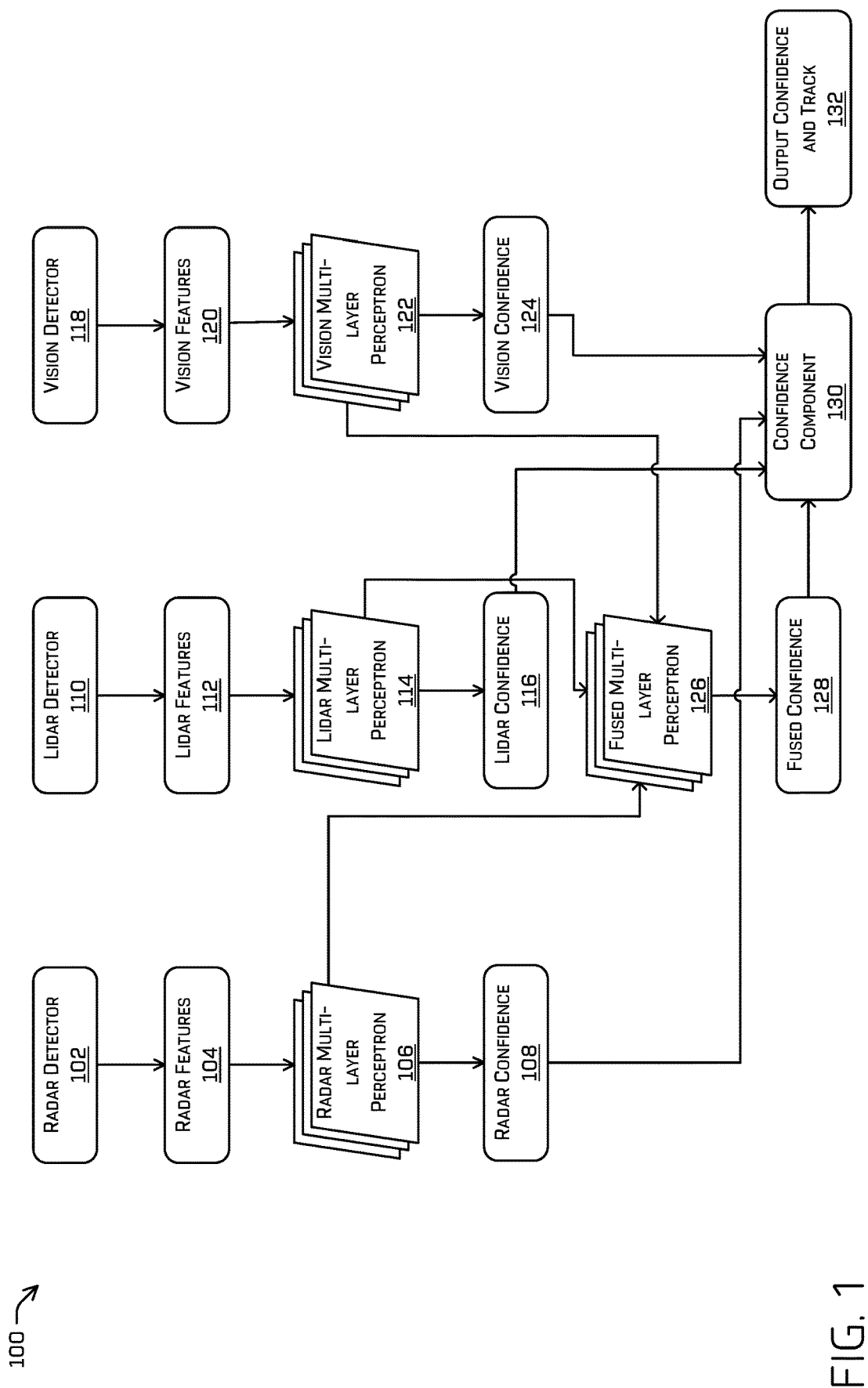
FIG. 1 is a flow diagram of an example system and techniques for determining confidence levels of different sensor modalities.

Techniques are discussed herein for determining confidence level(s) for objects detected and tracked by sensors in an environment. For example, sensor data can be captured using one or more of radar data, lidar data, image data, and the like. Such sensor data can be input to tracker(s) or model(s) trained to determine a track of object(s). Techniques can include determining confidence levels associated with individual sensor modalities using data generated by the individual sensor modalities and comparing the respective confidence levels to a threshold. Additionally, intermediate outputs of the trackers or models associated with individual sensor modalities may be combined into fused data incorporating data from multiple sensor modalities, and such fused data may include and/or comprise a group of objects detected by one or more sensor modalities. In some examples, a confidence level associated with the fused data may be determined, and the confidence level associated with the fused data may be compared to the threshold along with the confidence levels of the individual sensor modalities to determine an output from one of the sensor modalities. Accordingly, if a first confidence level determined via a single sensor modality is higher than a threshold and a second confidence level determined based on fused data is lower than the threshold, the second confidence level can be suppressed or replaced with the first confidence level and output to one or more of a planner system and/or a prediction system of the vehicle along with a track data of the group of objects based on one of the single sensor modality or the fused modality.

By way of example and without limitation, a perception system can receive sensor data from a plurality of modalities and determine object information (such as data for tracking an object in an environment). In some cases, data from all sensor modalities may be input to a single model to determine a track and/or a confidence level. If, for example, the lidar sensor and vision sensor does not detect the object, but the radar sensor does, the track for the object may have a relatively low confidence (e.g., because training examples where a true positive detection by one modality occurs at the same time as modalities reporting a false negative may be relatively rare). When downstream systems consume, receive, or otherwise process the track with low confidence (e.g., a planner system, prediction system, and the like), the systems may not have properly considered the object when planning (e.g., planning missions, trajectories, and the like for an autonomous vehicle). In some examples, when the single model determines a low confidence level, the track may not be output to downstream systems. Accordingly, the prediction system might not predict the movement of a pedestrian properly or the planner system may not properly account for the pedestrian when the confidence level is low because the downstream systems either processed a track associated with the pedestrian with low confidence or did not receive the track associated with the pedestrian because of the low confidence. However, determining a confidence level for data tracks individually, as well as based on fused data, can lead to a more accurate consideration of available data by better ensuring that a track associated with the object with high confidence is output to the downstream systems.

In some examples, a plurality of sensor configurations may be disposed on a vehicle, such as an autonomous vehicle, and operably connected to a controller and/or remote computing devices. The controller may receive a first signal from a first sensor configuration disposed on the vehicle. The first sensor configuration may include an image capture sensor capturing vision data representing a first scene (e.g., a portion of the environment visible to the image sensor as may be determined, for example, by a field of view). In some examples, the first signal may include the vision data. In some examples, the vision data may, for example, indicate a scene illustrating and/or including a first group of objects detectable in an environment in which the first sensor and/or the vehicle is present. In some examples, the controller may analyze the vision data by using a machine learned vision model to identify track data of one or more objects associated with the vision data and determine a confidence level associated with the vision data. In some examples, the vision model may be trained using ground truth indicative of whether the vision data is a ground truth object track.

In some examples, a second sensor configuration may be disposed on the vehicle. In some examples, the second sensor configuration may be a lidar sensor. In some examples, the controller may be configured to receive a second signal from the lidar sensor. In some examples, the second signal may include lidar data. In some examples, the lidar data may be captured simultaneously (or substantially simultaneously, within technical tolerances) with the vision data described above. In some examples, the lidar data may represent a second scene (e.g., a portion of the environment visible to the lidar sensor) captured by the lidar sensor simultaneously with the image data described above. In some examples, the lidar data may, for example, indicate a scene captured by the lidar sensor including a second group of objects detectable within the environment. In some examples, the controller may analyze the lidar data by using a machine learned lidar model to identify track data of one or more objects associated with the lidar data and determine a confidence level associated with the lidar data. In some examples, the lidar model may be trained using ground truth indicative of whether the lidar data is a ground truth object track. In some examples, depending on the accuracy and/or fidelity of the lidar data, the objects included in, for example, the second group of objects may be the same as the objects included in the first group of objects detectable by the image capture device (e.g., that at least a portion of the first group of objects and a portion of the second group of objects is co-visible to the image capture sensor and the lidar sensor simultaneously).

In some examples, a third sensor configuration may be disposed on the vehicle. In some examples, the third sensor configuration may be a radar sensor. In some examples, the controller may be configured to receive a third signal from the radar sensor. In some examples, the third signal may include radar data. In some examples, the radar data may be captured simultaneously with the vision data and/or the lidar data described above. In some examples, the sensor data may represent a third scene (e.g., a portion of the environment visible to the radar sensor). In some examples, the radar data may, for example, indicate a scene captured by the radar sensor including a third group of objects detectable within the environment. In some examples, the controller may analyze the radar data by using a machine learned radar model to identify track data of one or more objects associated with the radar data and determine a confidence level associated with the radar data. In some examples, the radar model may be trained using ground truth indicative of whether the radar data is a ground truth object track. In some examples, depending on the accuracy and/or fidelity of the radar data, the objects included in, for example, the third group of objects may be the same as the objects included in the first group of objects detectable by the image capture device and/or the second group of objects detectable by the lidar sensor (e.g., that at least a portion of the first group of objects and a portion of the second group of objects and/or a portion of the third group of objects is co-visible to the image capture sensor, the lidar sensor, and/or the radar sensor simultaneously).

In some examples, through a data fusion process, intermediate outputs associated with the vision data, the lidar data, and/or the radar data may be combined as fused sensor data. In some examples, the intermediate outputs may be the track data of the individual modalities as described above. In some examples, such fused sensor data may include and/or identify a fourth group of one or more objects predicted, determined, and/or otherwise indicated as being present within the environment based at least in part on the vision data, the lidar data, and/or the radar data. In some examples, the fused sensor data may represent a fourth scene. In some examples, the controller may analyze the fused sensor data by using a machine learned fused model to identify track data associated with the fused sensor data and determine a confidence level associated with the fused sensor data. In some examples the fused model may be trained using ground truth indicative of whether the fused sensor data is a ground truth object track.

In some examples, the confidence level associated with the fused sensor data and the confidence levels associated with the vision data, the lidar data, and/or the radar data may be compared to a threshold to determine whether the track data associated with the vision data, the track data associated with the lidar data, the track data associated with the radar data, or the track data associated with the fused sensor data is transmitted to a planner system associated with the vehicle and/or a prediction system associated with the vehicle. For example, when the confidence level associated with the fused sensor data is below the threshold and the confidence level associated with the radar data is above the threshold, then the track data associated with the radar data is transmitted to the planner system associated with the vehicle and/or the prediction system associated with the vehicle.

Techniques for determining an output of one of a plurality of sensor modalities to transmit to a planner system of a vehicle and/or a prediction system of the vehicle by using confidence levels associated with the individual sensor modalities and fused sensor data can improve the functions of a vehicle by providing a more accurate object detection and improve safe vehicle operations. In some examples, using outputs from individual modalities from low confidence levels, the fused sensor data may output track data with equally low confidence levels, and thereby, resulting in the perception system of the vehicle outputting a bounding box with low confidence, the prediction system of the vehicle unable to predict the movement of an object in the environment (e.g., a pedestrian, another vehicle, a bicyclist, and the like) properly or a planner system of the vehicle planning a trajectory too close to the object in the environment.

The methods, apparatuses, and systems described herein may be implemented in a number of ways. Example implementations are provided below with reference to the following figures. While this disclosure uses an autonomous vehicle in examples, techniques described herein are not limited application in autonomous vehicles. For example, any system that uses radar data to navigate an environment may benefit from the radar data processing techniques described. In another example, techniques described herein may be used on aircrafts, e.g., to identify other aircraft and/or moving objects. Moreover, non-autonomous vehicles could also benefit from techniques described herein, e.g., for collision detection and/or avoidance systems.

FIG. 1 illustrates an example flow diagram 100 of a system and techniques for determining confidence levels (also referred to as a "confidence value" or a "confidence score") of different sensor modalities. Example flow diagram 100 includes a radar detector 102, a lidar detector 110 and a vision detector 118.

In some examples, the process can include the radar detector 102 detecting radar features 104. In some examples, the radar features 104 may include radar data associated with an environment. Examples of radar features may be, but not limited to, object data such as a bounding box, velocity, yaw, center, acceleration, classification, dimensionality, track time (e.g., a time period indicating how long the object has been tracked using this modality), and the like. In some examples, the radar features 104 may be input into a radar multi-layer perceptron 106. In some examples, the radar multi-layer perceptron 106 may be a machine learned model. In some examples, the radar multi-layer perceptron 106 may output an intermediate radar output associated with the radar feature. In some examples, the intermediate radar output may be associated with a track data representative of the object in the environment. In some examples, the intermediate radar output may be associated with one of the layers (e.g., an embedding from an intermediate layer) of the radar multi-layer perceptron 106. In some examples, the intermediate radar output may include, but not limited to, a bounding box associated with the object, the velocity of the object, the pose of the object, and the like. In some examples, a radar confidence level 108 (also referred to as a "radar confidence value" or a "radar confidence score") may be determined using the radar multi-layer perceptron 106 and based on the radar features 104. As used herein, a confidence level or confidence value can correspond to a confidence that a modality-specific component detects an object or a confidence value corresponding to certain features of the object (e.g., a size, location, classification, velocity, etc.).

In some examples, the process can include the lidar detector 110 detecting lidar features 112. In some examples, the lidar features 112 may include lidar data associated with the environment. Examples of the lidar features may be, but not limited to, object data such as a bounding box, velocity, yaw, center, acceleration, classification, dimensionality, track time, and the like. In some examples, the lidar features 112 may be input into a lidar multi-layer perceptron 114. In some examples, the lidar multi-layer perceptron 114 may be a machine learned model. In some examples, the lidar multi-layer perceptron 114 may output an intermediate lidar output associated with the lidar features 112. In some examples, the intermediate lidar output may be associated with the track data representative of the object in the environment. In some examples, the intermediate lidar output may be associated with one of the layers (e.g., an embedding from an intermediate layer) of the lidar multi-layer perceptron 114. In some examples, the intermediate lidar output associated with the lidar features 112 may include, but not limited to, a bounding box associated with the object, the velocity of the object, the pose of the object, and the like. In some examples, a lidar confidence level 116 (also referred to as a "lidar confidence value" or a "lidar confidence score") may be determined using the lidar multi-layer perceptron 114 and based on the lidar features 112.

In some examples, the process can include the vision detector 118 detecting vision features 120. In some examples, the vision features 120 may include vision data (e.g., image data, camera data, and the like) associated with the environment. Examples of the vision features may be, but not limited to, object data such as a bounding box, velocity, yaw, center, acceleration, classification, dimensionality, track time, and the like. In some examples, the vision features 120 may be input into a vision multi-layer perceptron 122. In some examples, the vision multi-layer perceptron 122 may be a machine learned model. In some examples, the vision multi-layer perceptron 122 may output an intermediate vision output associated with the vision features 120. In some examples, the intermediate vision output may be associated with the track data representative of the object in the environment. In some examples, the intermediate vision output may be associated with one of the layers (e.g., an embedding from an intermediate layer) of the vision multi-layer perceptron 122. In some examples, the intermediate vision output may include, but not limited to, a bounding box associated with the object, the velocity of the object, the pose of the object, and the like. In some examples, a vision confidence level 124 (also referred to as a "vision confidence value" or a "vision confidence score") may be determined using the vision multi-layer perceptron 122 and based on the vision features 120.

In some examples, the intermediate radar output, the intermediate lidar output, and the intermediate vision output may be associated with the same object in the environment. In some examples, the intermediate radar output, the intermediate lidar output, and the intermediate vision output may be input into a fused multi-layer perceptron 126 (also referred to as a "multi-modality multi-layer perceptron" or a "multi-modality model"). In some examples, the intermediate radar output, the intermediate lidar output, and the intermediate vision output may be collectively referred to as fused sensor data (also referred to as "multi-modality sensor data"). In some examples, the fused multi-layer perceptron 126 may be a machine learned model. In some examples, the fused multi-layer perceptron 126 may output a fused output (also referred to as a "multi-modality output") associated with the fused sensor data. In some examples, the fused output may be associated with the track representative of the object in the environment. In some examples, the fused output may include, but not limited to, a bounding box associated with the object, the velocity of the object, the pose of the object, and the like. In some examples, a fused confidence level 128 (also referred to as a "fused confidence value," a "fused confidence score," a "multi-modality confidence level," a "multi-modality confidence value," or a "multi-modality confidence score") may be determined using the fused multi-layer perceptron 126 and based on the fused sensor data.

In some examples, the process can include a confidence component 130 receiving the radar confidence level 108, the lidar confidence level 116, the vision confidence level 124, and the fused confidence level 128. In some examples, the confidence component 130 can determine the confidence level to output based on whether the fused confidence level 128 is higher than the radar confidence level 108, the lidar confidence level 116, and the vision confidence level 124 or whether at least one of the radar confidence level 108, the lidar confidence level 116, or the vision confidence level 124 is higher than the fused confidence level 128. In some examples, this determination may be made by comparing at least one of the radar confidence level 108, the lidar confidence level 116, or the vision confidence level 124 and the fused confidence level 128 with a threshold. For example, when the fused confidence level 128 is below the threshold and the vision confidence level 124 is above the threshold, then the confidence component 130 can determine to output the vision confidence level 124. In some examples, there may be multiple thresholds where at least one of the radar confidence level 108, the lidar confidence level 116, or the vision confidence level 124 may be compared with a first threshold and the fused confidence level 128 may be compared with a second different threshold. In some examples, when the fused confidence level 128 is above the second threshold, the confidence component 130 can determine to output the fused confidence level 128. In some examples, when the fused confidence level 128 is below the second threshold and the vision confidence level 124 is above the threshold, the confidence component 130 can determine to output the vision confidence level 124.

As should be understood various schemas for are contemplated for use by confidence component 130. For example, confidences corresponding to any number (e.g., two) modalities can be aggregated and, if they meet threshold, the corresponding data may be used (even though another modality may indicate a low confidence). This may be useful in environmental situation, for example, that may be detrimental to certain modalities. In this way, confidence component 130 can adaptively output data from multiple modalities based on environmental factors such as weather, time of day, sensor orientation, sensor degradation, operational status of the sensor, etc. Confidence component 130 can implement one or more machine learned models, deterministic code, or combinations thereof. For example, the machine learned model can be trained to determine which environmental factors are indicative of certain corresponding modalities' outputs being used that result in valid perception output. In this manner, the training of a model to determine which modalities are beneficial in which conditions can be dissociated from a machine learned perception component trained to determine objects in an environment (which may be overly biased to use certain modalities). In some examples, confidence component 130 can use information received from one or more perception (e.g., modality-specific) components. As used herein, a confidence can be applied to a confidence for a size, shape, classification, or any other attribute corresponding to an object. In some examples, confidence component 130 can look at corresponding results and/or outputs from perception components (e.g., modality-based perceptrons) used the techniques disclosed herein. For example, if two modalities have a relatively lower confidence but output a corresponding classification, confidence component 130 may be more likely use the outputs from those modalities/components. In some examples, confidence component 130 may use one or more deterministic rules to ensure that certain objects are considered. For example, if any pipeline detects a pedestrian in a certain range of a vehicle at a corresponding confidence (e.g., for that range), then the vehicle may use that information to avoid an unsafe act in relation to the pedestrian.

In some examples, the process can include an operation 132 configured to output at least one of the radar confidence level 108, the lidar confidence level 116, the vision confidence level 124, or the fused confidence level 128 and the track representative the object in the environment. In some examples, the operation 132 can generate the track data representing the object in the environment and output the track data to a prediction system or a planning system of an autonomous vehicle. In some examples, the track data may be based on at least one of the radar intermediate output, lidar intermediate output, vision intermediate output, or the fused intermediate output depending on the modality of the confidence level being outputted. In some examples, the operation 132 can update the track data based on at least one of the radar intermediate output, lidar intermediate output, vision intermediate output, or the fused intermediate output depending on the modality of the confidence level being outputted. In some examples, the track data may include, but are not limited to, an object ID associated with the object and a shape representation associated with the object (e.g., bounding box, velocity, contour, pose, orientation, and the like).

Figure 2:
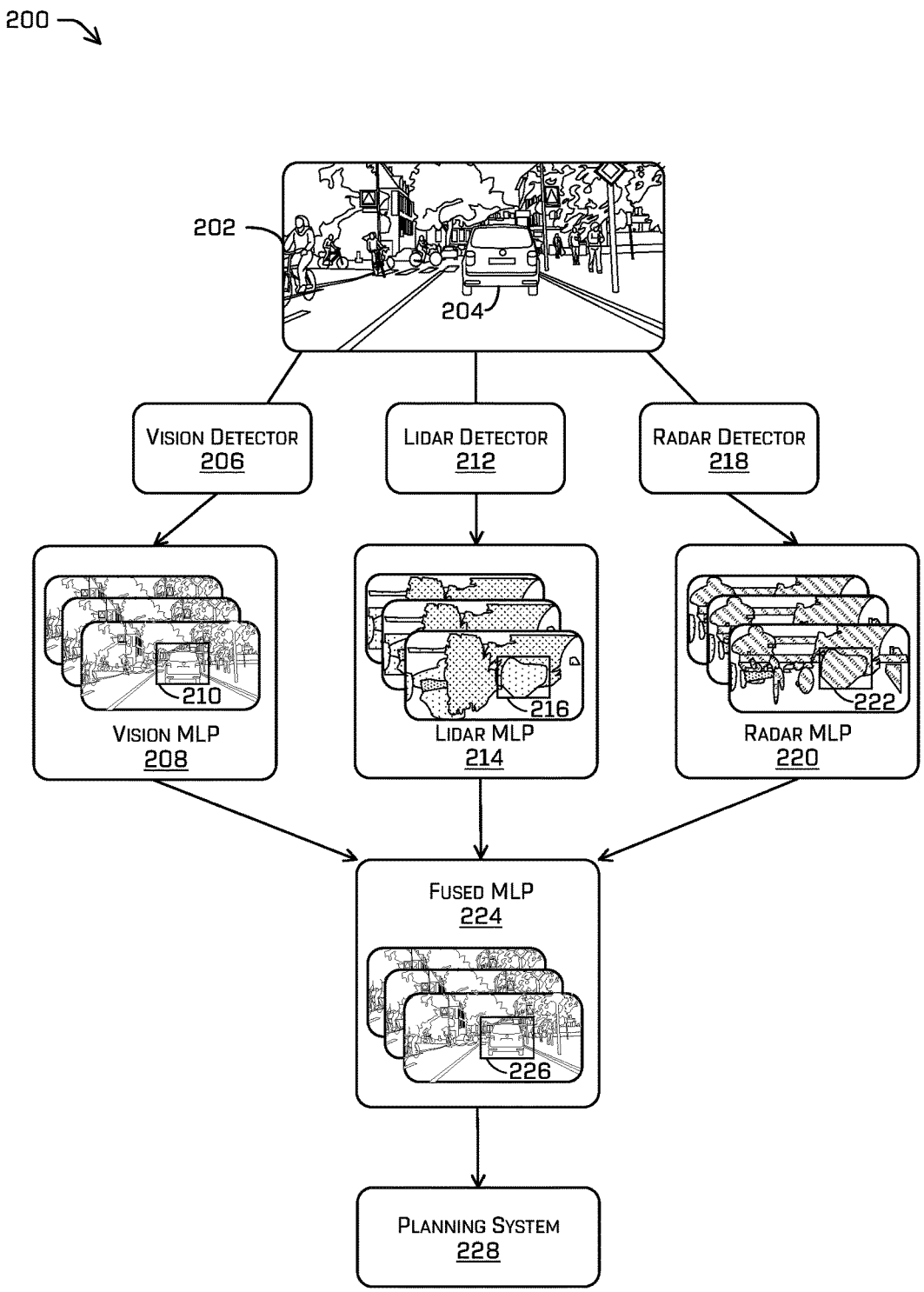
FIG. 2 is a pictorial flow diagram of determining a track of a fused modality model.

FIG. 2 illustrates an example pictorial flow diagram 200 of determining a track representing an object in an environment. FIG. 2 includes a vision detector 206, a lidar detector 212, and a radar detector 218. In some examples, the vision detector 206, the lidar detector 212, and the radar detector 218 may be same or similar to the vision detector 118, the lidar detector 110, and the radar detector 102.

In some examples, the vision detector 206, the lidar detector 212 and the radar detector 218 may be used by a vehicle while traversing environment 202. In some examples, the environment 202 may include an object 204. In some examples, the object 204 is another vehicle. The object 204 is not limited to a vehicle and may be other types of objects such as a pedestrian, a bicyclist, and the like.

In some examples, vision features detected by the vision detector 206 may be input into a vision multi-level perception 208. In some examples, the vision multi-level perception 208 may be same or similar to the vision multi-layer perceptron 122. In some examples, an intermediate vision output 210 may be determined using the vision multi-level perception 208. In some examples, the intermediate vision output 210 may include a bounding box associated with the object 204.

In some examples, lidar features detected by the lidar detector 212 may be input into a lidar multi-level perception 214. In some examples, the lidar multi-level perception 214 may be same or similar to the lidar multi-layer perceptron 114. In some examples, an intermediate lidar output 216 may be determined using the lidar multi-level perception 214. In some examples, the intermediate lidar output 216 may include a bounding box associated with the object 204.

In some examples, radar features detected by radar detector 218 may be input into a radar multi-level perception 220. In some examples, the radar multi-level perception 220 may be same or similar to the radar multi-layer perceptron 106. In some examples, an intermediate radar output 222 may be determined using the radar multi-level perception 220. In some examples, the intermediate radar output 222 may include a bounding box associated with the object 204.

In some examples, the intermediate vision output 210, the intermediate lidar output 216, and the intermediate radar output 222 may be input into a fused multi-level perception 224 to generate a fused output 226. In some examples, the fused multi-level perception 224 maybe same or similar to the fused multi-layer perceptron 126. In some examples, the fused output 226 may include a bounding box associated with the object 204. In some examples, track data associated with the object 204 may be generated from the fused output 226 and the track data may be transmitted to planner system 228. In some examples, planner system 228 may be a planner system of a vehicle such as an autonomous vehicle. In some examples, the track data may be generated and/or updated based on intermediate vision output 210, the intermediate lidar output 216, and the intermediate radar output 222 and confidence levels associated with the radar features, lidar features, vision features and/or fused features (e.g., using the fused multi-level perception 224) may be input into the planner system, the prediction system, another tracking model, and the like. In some examples, the planner system 228 may be same or similar to planning component 426 illustrated in FIG. 4. In some examples, a vehicle control system such as vehicle control system 402 of FIG. 4 may control the vehicle based on the track data.

Figure 3:
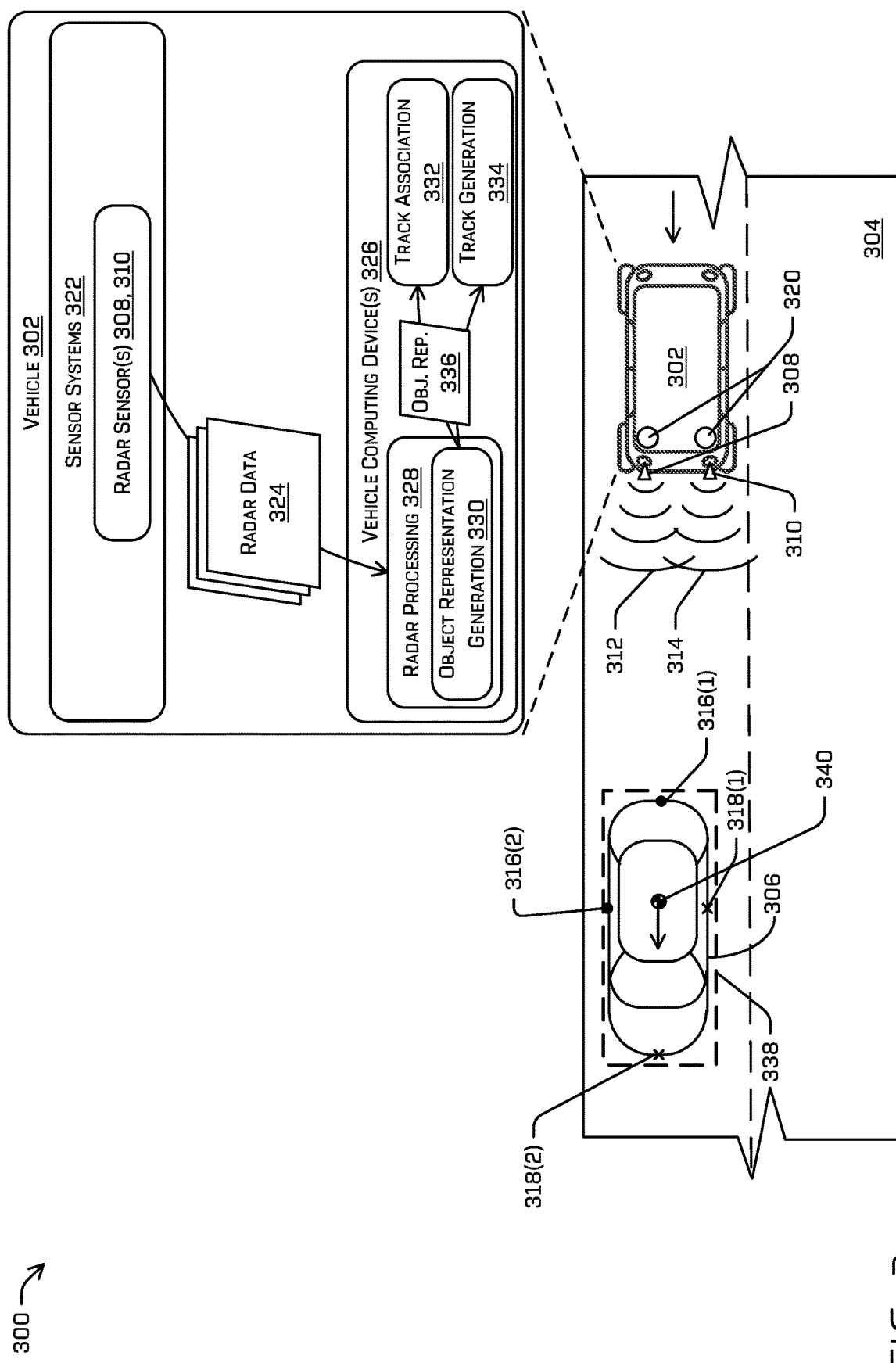
FIG. 3 is a schematic representation illustrating example systems and techniques for using radar data to track objects in an environment.

FIG. 3 is a schematic illustration showing an example scenario 300 in which a vehicle 302 is driving on a road surface 304. As illustrated, a second vehicle 306 is also travelling on the road surface 304. In the example scenario 300, the vehicle 302 and the second vehicle 306 are moving generally in the same direction and in the same lane of the road. In some examples, example scenario may be the same scenario illustrated in environment 202.

In some examples, the vehicle 302 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some examples, since the vehicle 302 can be configured to control all functions from start to stop, including all parking functions, it can be unoccupied. However, the vehicle 302 is merely an example, and the systems and methods described herein can be incorporated into any ground-borne, airborne, or waterborne vehicle, including those ranging from vehicles that need to be manually controlled by a driver at all times, to those that are partially or fully autonomously controlled. In additional implementations, techniques described herein may be useful in settings other than vehicles. The techniques described in this specification may be useful in many different applications in which sensor data is used to determine information about objects in an environment.

In some examples, the vehicle 302 may include a plurality of sensor configurations, including a first radar sensor 308 and a second radar sensor 310. As illustrated, the first radar sensor 308 and the second radar sensor 310 are arranged to propagate waves generally in a direction of travel of the vehicle 302 (e.g., generally along the direction of the arrow illustrated behind the vehicle 302). As also illustrated, the first radar sensor 308 and the second radar sensor 310 may have overlapping fields of view. Accordingly, first emitted radio waves 312, emitted by the first radar sensor 308, will reflect off the second vehicle 306 and return to the first radar sensor 308 where they are detected via a first radar scan. Similarly, second emitted radio waves 314, emitted by the second radar sensor 310, will also reflect off the second vehicle 306 and return to the second radar sensor 310 where they are detected via a second radar scan. In some examples, the first radar sensor 308 and the second radar sensor 310 may be substantially identical, except for their position on the vehicle 302. In some examples, the radar sensors 308 and 310 may be differently configured. In some examples, the radio waves 312, 314 may be emitted at different frequencies. In some examples, the radar sensors 308 and 310 may be configured such that scans at the radar sensors 308 and 310 have a different interval (e.g., a Doppler interval). In some examples, features of the radar sensors 308 and 310 may include, but not limited to, the center frequency, the scan type, the scan pattern, frequency modulation, the pulse repetition frequency, pulse repetition interval, and may be configured, for example, to create the different Doppler intervals. Accordingly, the radar sensors 308 and 310 may both be disposed to sense objects generally in the same direction relative to the vehicle 302.

The radar sensors 308 and 310 may receive the emitted radio waves 312 and 314 after the waves reflect off a surface in the environment (e.g., a surface of the second vehicle 306), and the radar sensors 308 and 310 can generate radar data based on the reflection. For instance, the radar data may include diverse types of information, including but not limited to a velocity associated with one or more points representative of surfaces or objects in the environment of the radar sensor. In some examples, when the radar sensors 308 and 310 are pulse-Doppler sensors, they may be able to determine a velocity of an object relative to the respective sensor.

FIG. 3 also illustrates a plurality of radar returns associated with radar sensors 308 and 310, schematically represented by points. In the illustration, first points 316(1) and 316(2) (collectively, the first points 316) are illustrated as circles, and represent radar returns associated with the radar sensor 308. That is, individual of the first points 316 are indicative of locations on the second vehicle 306 at which the emitted radio waves 312 reflect. Similarly, second points 318(1) and 318(2) (collectively the second points 318) are illustrated as "X"s, and represent radar returns associated with the radar sensor 310. Therefore, individual of the second points 318 are indicative of locations on the second vehicle 306 at which the emitted radio waves 314 reflect.

As also illustrated in FIG. 3, the vehicle 302 may also include a plurality of additional sensors 320. The additional sensors 320 may be disposed to sense objects generally in the same direction as the radar sensors 308 and/or 310. Examples of the additional sensors 320 may be, but not limited to, one or more of additional radar sensors, lidar sensors, imaging sensors (e.g., cameras), time-of-flight sensors, SONAR sensors, thermal imaging devices, or any the like. Although two instances of the additional sensors 320 are illustrated in FIG. 3, the vehicle 302 may include any number of additional sensors, with any number of different modalities. In some examples, the vehicle 302 may include a number of additional sensors disposed to detect objects at other relative positions.

As illustrated in the block diagram accompanying FIG. 3, the radar sensors 308 and 310 and the additional sensors 320 may represent types of sensor systems 322 on the vehicle 302. The radar sensors 308 and 310 may generate radar data 324. In some examples, the radar data 324 may include position data of the respective points 316, 318. In some examples, information associated with radar returns from the points 316, 318 may include information indicative of a location in the environment (e.g., a location of the points 316, 318). Moreover, when such points are associated with the second vehicle 306, as in the illustration, a position of the second vehicle 306 can be determined. In some examples, the location information may include a range and azimuth relative to the points 316, 318 or a position in a local or global coordinate system. In some examples, the radar data 324 may include signal strength information. In some examples, the signal strength may include a radar cross-section (RCS) measurement. In some examples, the radar data 324 may also include velocity information. For instance, a velocity of each of the points 316, 318 (and/or of the second vehicle 306) may be based on a frequency of radio energy reflected from the points 316, 318 and/or a time at which the reflected radio energy is detected.

Accordingly, the radar data 324 can include a distance of respective ones of the first points 316 from the radar sensor 308 (e.g., a range or radial distance), a velocity (e.g., a Doppler velocity) of the respective one of the first points 316 along the distance, a strength measurement (e.g., an RCS value), and/or additional information. Similarly, the radar data 324 can also include a distance of respective ones of the second points 318 from the radar sensor 310 (e.g., a range or radial distance), a velocity (e.g., a Doppler velocity) of the respective one of the second points 318 along the associated distance, strength information, and/or additional information.

In some examples, the radar data 324 is used generally to track objects. More specifically, FIG. 3 illustrates that the vehicle 302 can include one or more vehicle computing device(s) 326 for executing functionality associated with the radar data 324. The vehicle computing device(s) 326 include a radar processing system 328 having an associated object representation generation component 330, as well as a track association component 332 and a track generation component 334.

In some examples, the radar processing system 328 generally implements functionality to receive the radar data 324 from the radar sensor(s) 308 and 310 and generate object representations 336 of objects in an environment of the vehicle 302, such as representations of the second vehicle 306 and/or other dynamic and/or static objects in the environment. In some examples, the radar processing system 328 may be a radar pipeline that processes only radar data, like the radar data 324, e.g., at the exclusion of other sensor modalities. In some examples, the radar processing system 328 may include functionality to associate returns with each other and/or with specific objects. Thus, for example, the radar processing system 328 can determine that radar returns associated with the first points 316 and the second points 318 are associated with each other and/or with the second vehicle 306. In some examples, the radar processing system 328 can also determine that other returns (e.g., in a same radar scan) are associated with other objects in the environment (e.g., the road surface 304 proximate the second vehicle 306, other vehicles in the environment, and the like).

In some examples, the radar processing system 328 can cluster points (e.g., the first points 316 and the second points 318) based on information from those respective radar returns. For example, the first points 316 and the second points 318 may be closely situated (e.g., within a threshold distance), and in some examples, the radar processing system 328 can determine that those points are indicative of a single object. In some examples, a point cluster may include a plurality of points that have some likelihood (e.g., a level and/or degree of similarity) to identify a single object or grouping of objects that should be considered together (e.g., by a planning system of an autonomous vehicle).

The radar processing system 328 may be embodied as one or more data analysis structures, including one or more neural networks. In some examples, the identification of points as being associated with the second vehicle 306 may be performed by one or more machine-learned networks. In some examples, the radar processing system 328 may include one or more neural networks that process the radar data 324 to perform the grouping of points and association of points with objects just discussed. In some examples, the network can, for each return, identify an association of that point with one or more additional points, an association of that point with an object, classify the point (e.g., as being associated with a vehicle, a building, a pedestrian, or the like).

In some examples, the radar processing system 328 may also include the object representation generation component 330 configured to determine the object representation 336. More specifically, while the radar processing system 328 receives a plurality of radar points, e.g., from the radar sensors 308 and 310 and makes some determination on a per-point basis, the object representation generation component 330 generates single representations of objects based on the per-point data. In some examples, the object representation generation component 330 generates a bounding box 338 as the object representation 336. The bounding box 338 can be a two-dimensional representation of the second vehicle 306, generated by the object representation generation component 330 based on the first points 316, the second points 318, and/or other radar points. Although the bounding box 338 is illustrated as a two-dimensional bounding box, other instances of the object representation 336 can include other or different multi-dimensional representations, for example, a three-dimensional bounding box.

In some examples, the object representation 336 can also include other attributes or characteristics of objects, such as the second vehicle 306, as determined from the radar data 324. In some examples, the object representation 336 can include extents of the sensed object (e.g., embodied as the length, width, area, or the like of the bounding box 338). The object representation 336 can also include a position of the bounding box 338. In some examples, a position of the bounding box 338 may be coordinates associated with a point 340, which may represent a center of the bounding box 338. Although the point 340 is illustrated as being a center of the bounding box 338 the point may be other than the center. The object representation 336 can also include a velocity of the object. In some examples, the object representation 336 can also include one or more of a classification of the object (e.g., a vehicle, a pedestrian, a wheeled pedestrian, a bicyclist, a construction vehicle, an articulated vehicle, a building, or the like). In some examples, the object representation 336 may also include a confidence level associated with the representation.

In some examples, the object representation 336 can be a singular representation of an object (e.g., the second vehicle 306) based on a plurality of radar points. The vehicle computing device(s) 326 can use the object representation 336 to track objects, such as the second vehicle 306. As used herein, "tracking an object" generally relates to determining movement of an object (e.g., relative to the vehicle 302) over time. In some examples, the vehicle computing device(s) 326 may include functionality to generate and/or receive information about tracks of objects (e.g., as track data). In some examples, a track may generally describe attributes of a path or trajectory of an object in the environment of the vehicle 302. In some examples, the track may be a series of measured and/or predicted poses or states of the object (e.g., relative to the vehicle 302). In some examples, a track may include a series of multi-dimensional representations (e.g., two-dimensional or three-dimensional bounding boxes) generated at a predetermined frequency to represent/predict movement of the object.

In some examples, the track association component 332 includes functionality to determine whether the object representation 336 should be associated with an existing track (e.g., of a previously-sensed object). For example, the track association component 332 can include functionality to compare the object representation 336 to track data. For example, the attributes of the representation of the second vehicle 306 (e.g., attributes of the bounding box 338) may be compared to track data to determine whether the second vehicle 306 is already being tracked. In some examples, the comparison of the object representation 336 to track information can include comparing a velocity of the object representation to a track velocity, a position of the object representation to a track position, and the like.

The track generation component 334 can include functionality to update a previously-generated track. For example, if the track association component 332 determines that the object representation 336 is associated with a track (e.g., the object representation 336 represents an object that is already being tracked), the track generation component 334 can update the track using the object representation 336 (e.g., by predicting future movement of the second vehicle 306 using the object representation 336).

Figure 4:
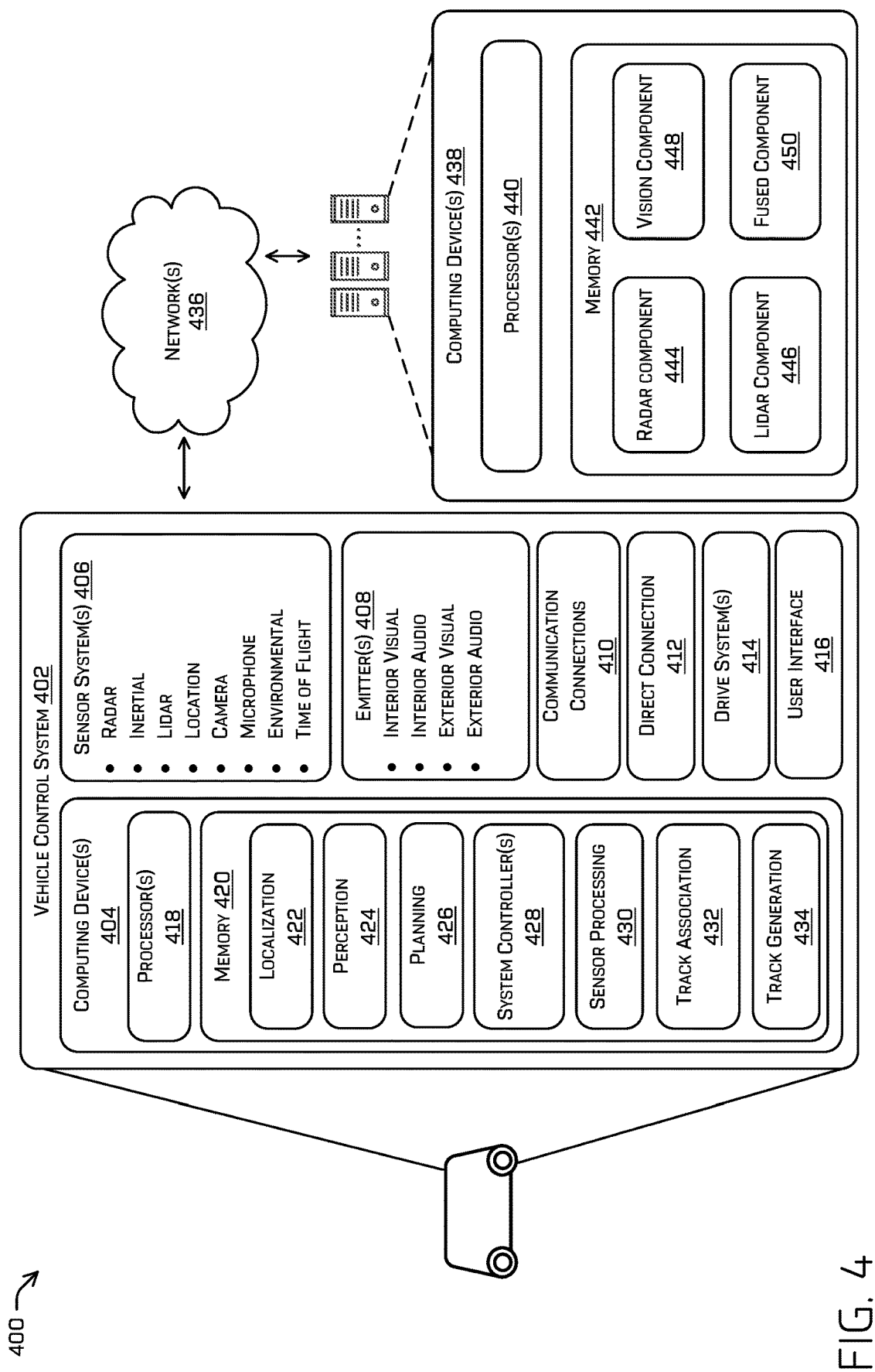
FIG. 4 includes a block diagram of an example architecture of a vehicle control system and a computing system for determining tracks of multiple sensor modalities, as described herein.

In some examples, the track generation component 334 can create a new track (e.g., in instances in which an object, such as the second vehicle 306, is newly detected). For example, in instances in which an object representation 336 does not match an existing track, the track generation component 334 can use the object representation 336 to generate a new track. In some examples, the track generation component 334 can receive multiple instances of the object representation 336 to generate a new track (e.g., based on different radar scans and/or radar scans from different times). In some examples, updated and/or new track information generated by the track generation component 334 may be used to control the vehicle 302 (e.g., to navigate relative to tracked objects such as the second vehicle 306). Additional examples of associating tracks and generating new tracks can be found, for example, in U.S. patent application Ser. No. 17/364,491 titled "Associating Radar Data with Tracked Objects" filed Jun. 30, 2021, the entirety of which is herein incorporated by reference in its entirety for all purposes FIG. 4 is a block diagram of an example system 400 for implementing the techniques described herein. In at least one example, the system 400 can include a vehicle control system 402 of a vehicle, such as an autonomous vehicle.

The vehicle control system 402 can include one or more vehicle computing devices 404, one or more sensor systems 406, one or more emitters 408, one or more communication connections 410, at least one direct connection 412, one or more drive systems 414, and a user interface 416.

The vehicle computing device(s) 404 can include one or more processors 418 and memory 420 communicatively coupled with the one or more processors 418. In the illustrated example, the vehicle control system 402 is an autonomous vehicle; however, the vehicle control system 402 could be any other type of vehicle. In the illustrated example, the memory 420 of the vehicle computing device 404 stores a localization component 422, a perception component 424, a planning component 426, one or more system controllers 428, a sensor processing system 430, a track association component 432, and a track generation component 434. Though depicted in FIG. 4 as residing in the memory 420 for illustrative purposes, it is contemplated that the localization component 422, the perception component 424, the planning component 426, the one or more system controllers 428, the sensor processing system 430, the track association component 432, and/or the track generation component 434 can additionally, or alternatively, be accessible to the vehicle control system 402 (e.g., stored on, or otherwise accessible by, memory remote from the vehicle control system 402).

In at least one example, the localization component 422 can include functionality to receive data from the sensor system(s) 406 to determine a position and/or orientation of the vehicle control system 402 (e.g., one or more of an x-, y-, z-position, roll, pitch, or yaw). For example, the localization component 422 can include and/or request/receive a map of an environment and can continuously determine a location and/or orientation of the autonomous vehicle within the map. In some instances, the localization component 422 can utilize SLAM (simultaneous localization and mapping), calibration, localization and mapping, simultaneously techniques, relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 422 can provide data to various components of the vehicle control system 402 to determine an initial position of an autonomous vehicle for generating a candidate trajectory, as discussed herein.

In some instances, the perception component 424 can include functionality to perform object detection, segmentation, and/or classification. In some examples, the perception component 424 can provide processed sensor data that indicates a presence of an entity that is proximate to the vehicle control system 402 and/or a classification of the entity as an entity type (e.g., car, pedestrian, cyclist, animal, building, tree, road surface, curb, sidewalk, unknown, etc.). In additional and/or alternative examples, the perception component 424 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. By way of non-limiting example, the perception component 424 may generate the object representations 336 from radar data, as discussed herein.

The planning component 426 can determine a path for the vehicle control system 402 to follow to traverse through an environment. The planning component 426 can determine various routes and trajectories and various levels of detail. For example, the planning component 426 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle control system 402 to navigate.

In at least one example, the vehicle computing device 404 can include one or more system controllers 428, which can be configured to control steering, propulsion, braking, safety, emitters, communication, and other systems of the vehicle control system 402. These system controller(s) 428 can communicate with and/or control corresponding systems of the drive system(s) 414 and/or other components of the vehicle control system 402.

The sensor processing system 430 can be the radar processing system 328 detailed above though it can also be, for example, lidar multi-layer perceptron 114 and/or vision multi-layer perceptron 122. Generally, the sensor processing system 430 can include functionality to receive sensor data (e.g., vision, lidar, radar, and the like) and generate representations of objects from the sensor data, e.g., as the object representations 336. For example, the sensor processing system 430 may receive sensor data comprising a plurality of points and information associated with the points, including position information, signal strength information, velocity information, or the like about points. The sensor processing system 430 may employ one or more processing models, algorithms, or the like, to the received sensor data to determine object representations such as the object representation 336. Each of the object representations may be a single representation generated from a plurality of radar points associated with the same, sensed object. Stated differently, the sensor processing system 430 generates single representations of objects based on sensor data deemed to be associated with those objects. The sensed object representations may be multi-dimensional, e.g., two- or three-dimensional bounding boxes, with associated attributes of the sensed object including but not limited to a velocity, position, classification, and/or other aspects of the sensed object's pose or state. Moreover, the sensor processing system 430 can generate one or more probabilities, confidence values, and/or the like associated with the object representations 336 and/or aspects or attributes of the object representations 336.

The track association component 432 may be same or similar to the track association component 332. The track association component 432 generally includes functionality to associate sensed object representations, (e.g., generated from radar data, lidar data, vision data, and the like) with track information for objects already being tracked. For instance, the track association component 432 can include functionality to compare aspects of a sensed object representation (e.g., one of the object representations 336) with tracked object representations, which may be part of a track. Additional details associated with operation the tracking association component 432 are discussed in connection with FIG. 3, as well as throughout this disclosure.

The track generation component 434 can be same or similar to the track generation component 334. The track generation component 434 generally includes functionality to receive object representations from radar data, lidar data, vision data, and the like, such object representations 336, and update existing tracks or create new tracks based thereon. For instance, when the track association component 432 determines that a sensed object is associated with an existing track, the track generation component can generate updated track information (e.g., for appending or updating the existing track). In some examples, when an object representation associated with a sensed object does not correspond to an existing track, the track generation component 434 generates a new track for association with the sensed object. Additional details associated with operation the tracking generation component 434 are discussed in connection with FIG. 3, as well as throughout this disclosure.

Although shown separate from other components for clarity and ease of reference, functionality of the sensor processing system 430, the track association component 432, and/or the track generation component 434 may be performed by other aspects of the vehicle control system 402. Without limitation, one or more of those components may be incorporated into the perception component 424. Aspects of this disclosure provide improved functionality resulting at least in part from use of a singular representation of a plurality of radar returns, regardless of the system, component, or system using that data according to the techniques detailed herein.

In at least one example, the sensor system(s) 406 can include the radar sensors described herein. Also in examples, the sensor system(s) 406 can include lidar sensors, ultrasonic transducers, SONAR sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, and as discussed herein, implementations of this disclosure may use multiple scans from multiple sensors, e.g., multiple radar sensors, with overlapping fields of view. Thus, for example, the autonomous vehicle control system 402 may include a number of radar sensors. In additional examples, the lidar sensors can include individual lidar sensors located at the corners, front, back, sides, and/or top of the vehicle control system 402. As another example, the camera sensors can include multiple cameras disposed at various locations about the exterior and/or interior of the vehicle control system 402. The sensor system(s) 406 can provide input to the vehicle computing device 404. Additionally, or alternatively, the sensor system(s) 406 can send sensor data, via the one or more networks 436, to the one or more computing device(s) at a particular frequency, after a lapse of a predetermined period of time, in near real-time, etc.

The emitter(s) 408 may be configured to emit light and/or sound. The emitter(s) 408 in this example include interior audio and visual emitters to communicate with passengers of the vehicle control system 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. In some examples, one or more of the interior emitters may be used to signal to the passenger that the vehicle is approaching or has arrived at an unmapped region and that continued movement in the unmapped region will require permission and/or manual control. In addition, or alternatively, the interior emitters may alert the passenger(s) that a teleoperator or other external source (e.g., a passenger-in-waiting) has taken manual control of the vehicle control system 402. The emitter(s) 408 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 410 can enable communication between the vehicle control system 402 and one or more other local or remote computing device(s). For instance, the communication connection(s) 410 can facilitate communication with other local computing device(s) on the vehicle control system 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle control system 402 to communicate with a remote teleoperations computing device or other remote controllers.

The communications connection(s) 410 can include physical and/or logical interfaces for connecting the vehicle computing device 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle control system 402 can include the drive system(s) 414. In some examples, the vehicle control system 402 can have a single drive system 414. In at least one example, if the vehicle control system 402 has multiple drive systems 414, individual drive systems 414 can be positioned on opposite ends of the vehicle control system 402 (e.g., the front and the rear, etc.). In at least one example, the drive system(s) 414 can include one or more sensor systems to detect conditions of the drive system(s) 414 and/or the surroundings of the vehicle control system 402. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle control system 402 (e.g., the sensor system(s) 406).

The drive system(s) 414 can include many vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processors and memory communicatively coupled with the one or more processors. The memory can store one or more systems to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle control system 402. For example, the direction connection 412 can allow the transfer of energy, fluids, air, data, etc. between the drive system(s) 414 and the vehicle. In some instances, the direct connection 412 can further releasably secure the drive system(s) 414 to the body of the vehicle control system 402.

The user interface 416 may include one or more devices, buttons and/or control panels via which a passenger can communicate with the vehicle control system 402. In non-limiting examples, a passenger in the vehicle control system 402 may control functionality of the vehicle control system 402 via interaction(s) with the user interface 416. In other examples, the user interface 416 may comprise a microphone configured to receive a verbal or spoken input. Generally, the user interface 416 may provide a means though which a passenger can interface with the vehicle computing device(s) 404.

In at least one example, the vehicle control system 402 may be in communication, via one or more network(s) 436, with one or more computing device(s) 438. For example, as described herein, the vehicle control system 402 can communicate with the one or more computing device(s) 438 via the network(s) 436. In some examples, the vehicle control system 402 can receive control signals from the computing device(s) 438. In other examples, the vehicle control system 402 can transmit information to the computing device(s) 438.

In some examples, the computing device(s) 438 can include processor(s) 440 and memory 442 communicatively coupled with the processor(s) 440. In the illustrated example, the memory 442 of the computing device(s) 438 includes a radar component 444, a lidar component 446, a vision component 448, a fused component 450. In some examples, the radar component 444 may include software necessary to process radar data as illustrated in FIGS. 1-3. In some examples, the lidar component may include software necessary to process lidar data as illustrated in FIGS. 1 and 2. In some examples, the vision component may include software necessary to process vision data as illustrated in FIGS. 1 and 2. In some examples, the fused component may include software necessary to process fused sensor data as illustrated in FIGS. 1 and 2.

In some instances, aspects of some or all of the components discussed herein can include any models, algorithms, and/or machine learning algorithms. For example, in some instances, aspects of the components in the memory 420 and/or 442 can be implemented as neural network(s).

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 5:
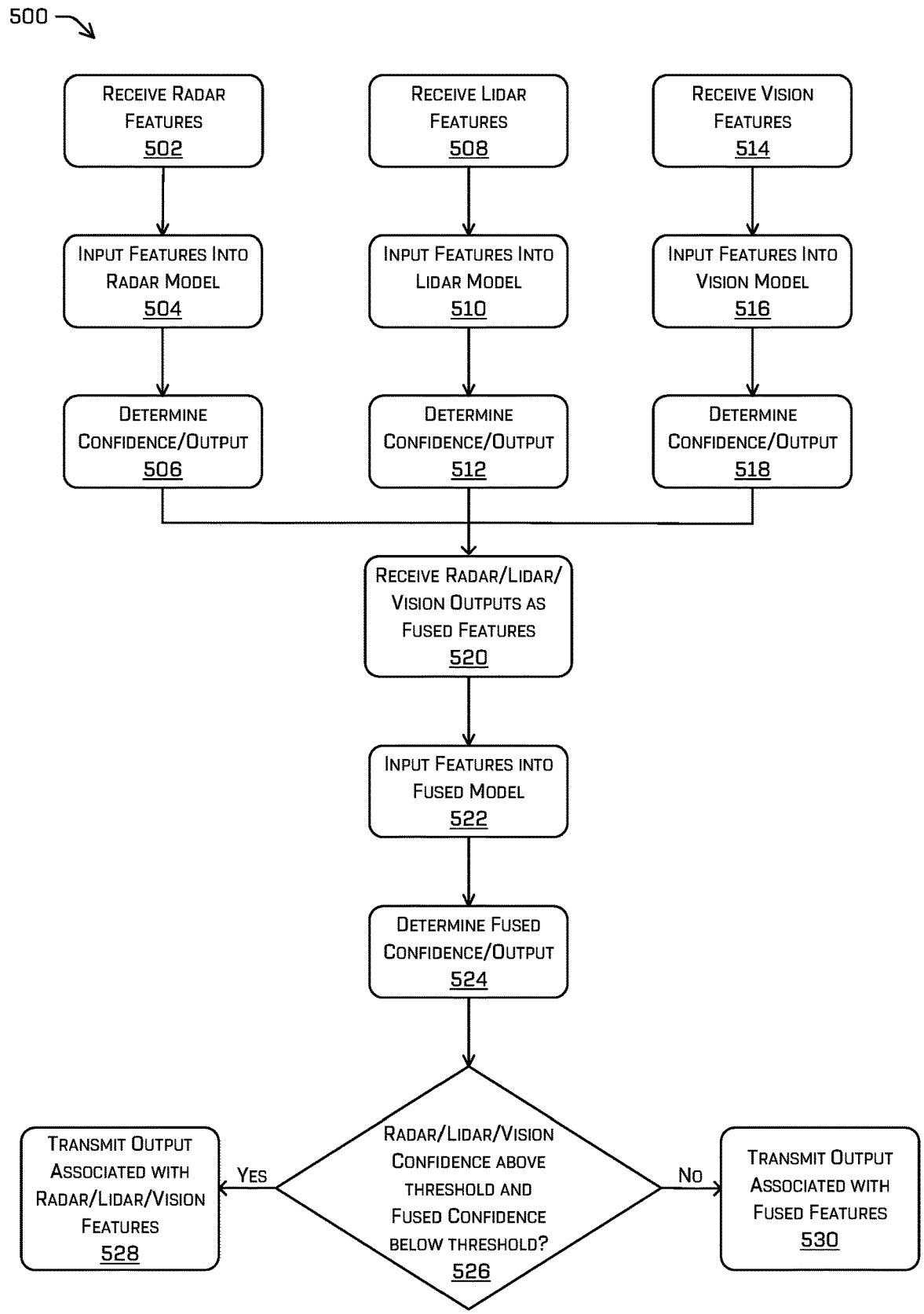
FIG. 5 is a flow diagram illustrating an example process for determining a track from a plurality of sensor modalities to output.

FIG. 5 depicts an example process 500 for determining a track from a plurality of sensor modalities to output. For example, some or all of the process 500 can be performed by one or more components in FIG. 4, as described herein. For example, some or all of the process 500 can be performed by the radar component 444, lidar component 446, vision component 448, and/or fused component 450.

At operation 502, the process can include receiving radar features from a radar sensor configuration. Additional details associated with operation 502 are discussed in connection with FIGS. 1-3, as well as throughout this disclosure.

At operation 504, the process can include inputting the radar features into a radar model. In some examples, the radar model may be a machine learned model. Additional details associated with operation 504 are discussed in connection with FIGS. 1 and 2, as well as throughout this disclosure.

At operation 506, the process can include determining a confidence level (also known as a "confidence value" or a "confidence score") associated with the radar features and an output associated with the radar features. In some examples, the output associated with the radar features may be associated with a track data associated with an object in an environment. In some examples, the output may be an intermediate radar output. Additional details associated with operation 506 are discussed in connection with FIGS. 1 and 2, as well as throughout this disclosure.

At operation 508, the process can include receiving lidar features from a lidar sensor configuration. Additional details associated with operation 508 are discussed in connection with FIGS. 1 and 2, as well as throughout this disclosure.

At operation 510, the process can include inputting the lidar features into a lidar model. In some examples the lidar model may be a machine learned model. Additional details associated with operation 510 are discussed in connection with FIGS. 1 and 2, as well as throughout this disclosure.

At operation 512, the process can include determining a confidence level (also known as a "confidence value" or a "confidence score") associated with the lidar features and an output associated with the lidar features. In some examples, the output associated with the lidar features may be associated with the track data associated with the object in the environment. In some examples, the output may be an intermediate lidar output. Additional details associated with operation 512 are discussed in connection with FIGS. 1 and 2, as well as throughout this disclosure.

At operation 514, the process can include receiving vision features from a vision sensor configuration (e.g., an image sensor). Additional details associated with operation 514 are discussed in connection with FIGS. 1 and 2, as well as throughout this disclosure.

At operation 516, the process can include inputting the vision features into a vision model. In some examples the vision model may be a machine learned model. Additional details associated with operation 516 are discussed in connection with FIGS. 1 and 2, as well as throughout this disclosure.

At operation 518, the process can include determining a confidence level (also known as a "confidence value" or a "confidence score") associated with the vision features and an output associated with the vision features. In some examples, the output associated with the vision features may be associated with the track data associated with the object in the environment. In some examples, the output may be an intermediate vision output. Additional details associated with operation 518 are discussed in connection with FIGS. 1 and 2, as well as throughout this disclosure.

At operation 520, the process can include receiving and combining the intermediate radar output, intermediate lidar output, and intermediate vision output as fused features. Additional details associated with operation 520 are discussed in connection with FIGS. 1 and 2, as well as throughout this disclosure.

At operation 522, the process can include inputting the fused features into a fused model. In some examples the fused model may be a machine learned model. Additional details associated with operation 522 are discussed in connection with FIGS. 1 and 2, as well as throughout this disclosure.

At operation 524, the process can include determining a confidence level (also known as a "confidence value" or a "confidence score") associated with the fused features and an output associated with the fused features. In some examples, the output associated with the fused features (also referred to as a "fused output" or a "multi-modality output") may be associated with the track data associated with the object in the environment. Additional details associated with operation 524 are discussed in connection with FIGS. 1 and 2, as well as throughout this disclosure.

At operation 526, the process can include determining whether the confidence level associated with one of radar, lidar, or vision features is above a threshold and the confidence level associated with the fused features is under the threshold. If yes, then at operation 528, the process can include transmitting the output associated with one of radar, lidar, or vision features (e.g., the track data associated with the object and based on one of the sensor modalities) to a planner system of a vehicle. If no, then at operation 530, the process can include transmitting the output associated with the fused features (e.g., the track data associated with the object and based on with the fused modality) to the planner system of the vehicle. In some examples, a vehicle control system can use the track data to control the vehicle. Additional details associated with operation 526-530 are discussed in connection with FIGS. 1 and 2, as well as throughout this disclosure.

EXAMPLE CLAUSES

A: A system comprising: one or more processors; and one or more non-transitory computer readable media storing instructions executable by the one or more processors, wherein the instructions, when executed, cause the system to perform operations comprising: receiving first feature data from a first detector trained to detect objects based on radar data; receiving second feature data from a second detector trained to detect objects based on at least one of lidar data or camera data; inputting the first feature data to a first model; inputting the second feature data to a second model; receiving, from the first model and based at least in part on the first feature data, a first confidence score; receiving, from the second model and based at least in part on the second feature data, a second confidence score; receiving a first intermediate output from the first model; receiving a second intermediate output from the second model; inputting the first intermediate output and the second intermediate output to a third model; receiving, from the third model and based at least in part on the first intermediate output and the second intermediate output, a third confidence score; determining that the third confidence score is below a threshold; determining that the first confidence score is above the threshold; and outputting, based at least in part on determining that the first confidence score is above the threshold and the third confidence score is below the threshold and based at least in part on the first intermediate output, a track representing an object in an environment.

B: The system of paragraph A, the operations further comprising: training the first model based at least in part on ground truth indicative of whether the first feature data are associated with a ground truth object track.

C: The system of paragraph A, wherein the track comprises an object identifier, the operations further comprising: updating the track based at least in part on the camera data.

D: The system of paragraph A, the operations further comprising: outputting the track to at least one of a prediction system or a planning system; and controlling an autonomous vehicle based at least in part on the track and the first confidence score.

E: The system of paragraph A, wherein the first intermediate output is an embedding from an intermediate layer of the first model.

F: A method comprising: receiving first feature data from a sensor operating via a first modality; inputting the first feature data to a first model; receiving, from the first model and based at least in part on the first feature data, a first modality confidence score associated with an object; receiving a first intermediate output from the first model; inputting the first intermediate output to a multi-modality model; receiving, from the multi-modality model and based at least in part on the first intermediate output, a multi-modality confidence score associated with the object; and outputting, based at least in part on the first modality confidence score and the multi-modality confidence score, data associated with the object.

G: The method of paragraph F, further comprising: determining that the first modality confidence score is higher than the multi-modality confidence score; and outputting, based at least in part on the first modality confidence score being higher than the multi-modality confidence score, the data associated with the object.

H: The method of paragraph G, wherein determining that the first modality confidence score is higher than the multi-modality confidence score comprises: determining that the multi-modality confidence score is below a threshold; and determining that the first modality confidence score is above the threshold.

I: The method of paragraph F, wherein the data associated with the object is a track representing the object.

J: The method of paragraph I, further comprising: receiving a multi-modality output from a second model; and generating, based at least in part on the first intermediate output or the multi-modality output, the track representing the object.

K: The method of paragraph I, further comprising: receiving a multi-modality output from a second model; updating, based at least in part on the first modality confidence score and the multi-modality confidence score, the track representing the object with at least one of the first intermediate output or the multi-modality output; and outputting, based at least in part on the first modality confidence score and the multi-modality confidence score, the track representing the object to at least one of a prediction system or a planning system.

L: The method of paragraph F, further comprising: controlling, based at least in part on the data associated with the object, an autonomous vehicle.

M: The method of paragraph F, wherein the first model is a multi-layer perceptron.

N: The method of paragraph F, wherein the first feature data are associated with at least one of radar data, lidar data, or camera data.

O: The method of paragraph F, wherein the sensor is a first sensor, further comprising: receiving second feature data from a second sensor operating in a second modality that is different from the first modality; inputting the second feature data to a second model; receiving, from the second model and based at least in part on the second feature data, a second modality confidence score associated with the object; receiving a second intermediate output from the second model; inputting the second intermediate output to the multi-modality model; receiving, from the multi-modality model and based at least in part on the first intermediate output and the second intermediate output, a multi-modality confidence score associated with the object; and outputting, based at least in part on the first modality confidence score, the second modality confidence score, and the multi-modality confidence score, the data associated with the object.

P: One or more non-transitory computer readable media storing instructions that, when executed by one or more processors, cause the processors to perform operations comprising: receiving first feature data from a sensor operating via a first modality; inputting the first feature data to a first model; receiving, from the first model and based at least in part on the first feature data, a first modality confidence score associated with an object; receiving a first intermediate output from the first model; inputting the first intermediate output to a multi-modality model; receiving, from the multi-modality model and based at least in part on the first intermediate output, a multi-modality confidence score associated with the object; and outputting, based at least in part on the first modality confidence score and the multi-modality confidence score, data associated with the object.

Q: The one or more non-transitory computer readable media of paragraph P, wherein the data associated with the object is a track representing the object.

R: The one or more non-transitory computer readable media of paragraph Q, the operations further comprising: receiving a multi-modality output from a second model; and generating, based at least in part on the first intermediate output or the multi-modality output, the track representing the object.

S: The one or more non-transitory computer readable media of paragraph Q, the operations further comprising: receiving a multi-modality output from a second model; updating, based at least in part on the first modality confidence score and the multi-modality confidence score, the track representing the object with at least one of the first intermediate output or the multi-modality output; and outputting, based at least in part on the first modality confidence score and the multi-modality confidence score, the track representing the object to at least one of a prediction system or a planning system.

T: The one or more non-transitory computer readable media of paragraph P, wherein the sensor is a first sensor, further comprising: receiving second feature data from a second sensor operating in a second modality that is different from the first modality; inputting the second feature data to a second model; receiving, from the second model and based at least in part on the second feature data, a second modality confidence score associated with the object; receiving a second intermediate output from the second model; inputting the second intermediate output to the multi-modality model; receiving, from the multi-modality model and based at least in part on the first intermediate output and the second intermediate output, a multi-modality confidence score associated with the object; and outputting, based at least in part on the first modality confidence score, the second modality confidence score, and the multi-modality confidence score, the data associated with the object.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
one or more processors; and
one or more non-transitory computer readable media storing instructions executable by the one or more processors, wherein the instructions, when executed, cause the system to perform operations comprising:
receiving first feature data from a first detector trained to detect objects based on radar data;
receiving second feature data from a second detector trained to detect objects based on at least one of lidar data or camera data;
inputting the first feature data to a first model;
inputting the second feature data to a second model;
receiving, from the first model and based at least in part on the first feature data, a first confidence score;
receiving, from the second model and based at least in part on the second feature data, a second confidence score;
receiving a first intermediate output from the first model;
receiving a second intermediate output from the second model;
inputting the first intermediate output and the second intermediate output to a third model;
receiving, from the third model and based at least in part on the first intermediate output and the second intermediate output, a third confidence score;
determining that the third confidence score is below a threshold;
determining that the first confidence score is above the threshold; and
outputting, based at least in part on determining that the first confidence score is above the threshold and the third confidence score is below the threshold and based at least in part on the first intermediate output, a track representing an object in an environment.

2. The system of claim 1, the operations further comprising:
training the first model based at least in part on ground truth indicative of whether the first feature data are associated with a ground truth object track.

3. The system of claim 1, wherein the track comprises an object identifier, the operations further comprising:
updating the track based at least in part on the camera data.

4. The system of claim 1, the operations further comprising:
outputting the track to at least one of a prediction system or a planning system; and
controlling an autonomous vehicle based at least in part on the track and the first confidence score.

5. The system of claim 1, wherein the first intermediate output is an embedding from an intermediate layer of the first model.

6. A method comprising:
receiving first feature data from a sensor operating via a first modality;
inputting the first feature data to a first model;
receiving, from the first model and based at least in part on the first feature data, a first modality confidence score associated with an object;
receiving a first intermediate output from the first model;
inputting the first intermediate output to a multi-modality model;
receiving, from the multi-modality model and based at least in part on the first intermediate output, a multi-modality confidence score associated with the object;
determining that the multi-modality confidence score is below a threshold;
determining that the first modality confidence score is above the threshold; and
outputting, based at least in part on the first modality confidence score being above the threshold and the multi-modality confidence score being below the threshold and based at least in part on the first intermediate output, data associated with the object, the data comprising a track representing the object.

7. The method of claim 6, further comprising:
determining, based at least in part on the first modality confidence score being above the threshold and the multi-modality confidence score being below the threshold, that the first modality confidence score is higher than the multi-modality confidence score.

8. The method of claim 6, further comprising:
receiving a multi-modality output from a second model; and
generating, based at least in part on the first intermediate output or the multi-modality output, the track representing the object.

9. The method of claim 6, further comprising:
receiving a multi-modality output from a second model;

updating, based at least in part on the first modality confidence score and the multi-modality confidence score, the track representing the object with at least one of the first intermediate output or the multi-modality output; and outputting, based at least in part on the first modality confidence score and the multi-modality confidence score, the track representing the object to at least one of a prediction system or a planning system.

10. The method of claim 6, further comprising:
controlling, based at least in part on the data associated with the object, an autonomous vehicle.

11. The method of claim 6, wherein the first model is a multi-layer perceptron.

12. The method of claim 6, wherein the first feature data are associated with at least one of radar data, lidar data, or camera data.

13. The method of claim 6, wherein the sensor is a first sensor, further comprising:
receiving second feature data from a second sensor operating in a second modality that is different from the first modality;
inputting the second feature data to a second model;
receiving, from the second model and based at least in part on the second feature data, a second modality confidence score associated with the object;
receiving a second intermediate output from the second model;
inputting the second intermediate output to the multi-modality model;
receiving, from the multi-modality model and based at least in part on the first intermediate output and the second intermediate output, a multi-modality confidence score associated with the object; and
outputting, based at least in part on the first modality confidence score, the second modality confidence score, and the multi-modality confidence score, the data associated with the object.

14. One or more non-transitory computer readable media storing instructions that, when executed by one or more processors, cause the one or more processors to perform operations comprising:
receiving first feature data from a sensor operating via a first modality;
inputting the first feature data to a first model;
receiving, from the first model and based at least in part on the first feature data, a first modality confidence score associated with an object;
receiving a first intermediate output from the first model;
inputting the first intermediate output to a multi-modality model;
receiving, from the multi-modality model and based at least in part on the first intermediate output, a multi-modality confidence score associated with the object;
determining that the multi-modality confidence score is below a threshold;
determining that the first modality confidence score is above the threshold; and
outputting, based at least in part on the first modality confidence score being above the threshold and the multi-modality confidence score being below the threshold and based at least in part on the first intermediate output, data associated with the object, the data comprising a track representing the object.

15. The one or more non-transitory computer readable media of claim 14, the operations further comprising:
receiving a multi-modality output from a second model; and
generating, based at least in part on the first intermediate output or the multi-modality output, the track representing the object.

16. The one or more non-transitory computer readable media of claim 14, the operations further comprising:
receiving a multi-modality output from a second model;
updating, based at least in part on the first modality confidence score and the multi-modality confidence score, the track representing the object with at least one of the first intermediate output or the multi-modality output; and
outputting, based at least in part on the first modality confidence score and the multi-modality confidence score, the track representing the object to at least one of a prediction system or a planning system.

17. The one or more non-transitory computer readable media of claim 14, wherein the sensor is a first sensor, further comprising:
receiving second feature data from a second sensor operating in a second modality that is different from the first modality;
inputting the second feature data to a second model;
receiving, from the second model and based at least in part on the second feature data, a second modality confidence score associated with the object;
receiving a second intermediate output from the second model;
inputting the second intermediate output to the multi-modality model;
receiving, from the multi-modality model and based at least in part on the first intermediate output and the second intermediate output, a multi-modality confidence score associated with the object; and
outputting, based at least in part on the first modality confidence score, the second modality confidence score, and the multi-modality confidence score, the data associated with the object.

18. The method of claim 6, further comprising:
training the first model based at least in part on ground truth indicative of whether the first feature data are associated with a ground truth object track.

19. The method of claim 6, wherein the track comprises an object identifier, the method further comprising:
updating the track based at least in part on camera data.

20. The method of claim 6, further comprising:
outputting the track to at least one of a prediction system or a planning system; and
controlling an autonomous vehicle based at least in part on the track and the first modality confidence score.

* * * * *